United States Patent [19]

Geno

[11] Patent Number: 4,762,308
[45] Date of Patent: Aug. 9, 1988

[54] DAMPING VALVE FOR AIR SPRING SUSPENSION SYSTEMS

[75] Inventor: Wayne H. Geno, Cicero, Ind.

[73] Assignee: The Firestone Tire & Rubber Company, Akron, Ohio

[21] Appl. No.: 31,642

[22] Filed: Mar. 30, 1987

[51] Int. Cl.$^4$ ............................. F16F 9/04; F16F 9/43; F16F 5/00; F16K 15/14

[52] U.S. Cl. ......................... 267/64.27; 188/298; 267/256; 267/64.26; 267/64.28; 137/849

[58] Field of Search ............. 267/35, 113, 217, 218, 267/219, 220, 256, 140.1, 64.11, 64.15, 64.19, 64.21, 64.24, 64.26, 64.27, 64.28, 64.23, 124, 127; 188/298, 281, 282, 322.22; 137/513.3, 513.5, 512.15, 859, 849; 280/711, 714; 248/560, 636

[56] References Cited

U.S. PATENT DOCUMENTS

| | | | |
|---|---|---|---|
| 1,516,004 | 11/1924 | Eckrode et al. | 267/64.23 |
| 2,809,825 | 10/1957 | Allinquant | 267/64.26 |
| 3,831,628 | 8/1974 | Kintner | 137/512.15 |
| 3,883,030 | 5/1975 | Mathews | 220/204 |
| 3,901,272 | 8/1975 | Banners | 137/513.5 |
| 4,045,009 | 8/1977 | Pees | 267/64.26 X |
| 4,383,679 | 5/1983 | Kakimoto | 267/140.1 |

FOREIGN PATENT DOCUMENTS

| | | | |
|---|---|---|---|
| 0098331 | 1/1984 | European Pat. Off. | 267/140.1 |
| 0016116 | 1/1986 | Japan | 267/64.21 |
| 1231766 | 5/1971 | United Kingdom | 267/64.27 |
| 783515 | 11/1980 | U.S.S.R. | |
| 1100442 | 6/1984 | U.S.S.R. | |

Primary Examiner—Andres Kashnikow
Assistant Examiner—Robert J. Oberleitner
Attorney, Agent, or Firm—Ronald Breitkrenz

[57] ABSTRACT

An air spring for motor vehicles to absorb road shocks includes first and second axially spaced end members with an intervening flexible sleeve forming a fluid pressure chamber therebetween. An improved two-way damping valve connects the pressure chamber to a fluid reservoir and provides damping for the air spring by restricting fluid flow in one direction, either into or out of the pressure chamber, without materially effecting the fluid flow in the opposite direction. The valve includes a flexible diaphragm formed of reinforced rubber having slots which provide one or more flaps. The diaphragm preferably is mounted on a rigid annular washer having a predetermined size center opening forming a damping orifice. The flaps are drawn automatically into the washer opening to restrict the fluid flow through the orifice when the fluid moves in one direction, with the flaps moving away from the orifice to permit free movement of the fluid therethrough when the fluid is moving in an opposite direction. In another embodiment the damping valve is mounted in a strut-type fluid shock absorber combined with an air spring.

14 Claims, 4 Drawing Sheets

DAMPING VALVE FOR AIR SPRING SUSPENSION SYSTEMS

TECHNICAL FIELD

The invention relates generally to suspension systems and in particular to an improved air spring suspension system for vehicles. More particularly, the invention relates to such a suspension system which includes an improved value which allows fluid flow freely in one direction and restricts the fluid flow in the opposite direction to provide the necessary damping performance for a vehicle.

BACKGROUND ART

Pneumatic springs commonly referred to as air springs, have been used with motor vehicles for a number of years to provide cushioning between movable parts of the vehicle, primarily to absorb shock loads impress on the vehicle axles by the wheels striking an object in the road or falling into a depression. These air springs usually consist of a flexible elastomeric sleeve or bellows containing a supply of compressed air or other fluid and having one or more pistons located within the flexible sleeve to cause compression and expansion as the vehicle experiences the road shocks. The pistons cause compression and expansion within the spring sleeve and since the sleeve is of a flexible material permits the pistons to move axially with respect to each other within the interior of the sleeve. The ends of the sleeve usually are sealingly connected to the pistons or end members and have one or more rolled ends which permit the end members to move axially with respect to each other between a jounce or collapsed position and a rebound or extended position without damaging the flexible sleeve.

It is desirable that a damping mechanism or device be used in combination with such air springs to provide damping for controlling the movement of the air springs. One type of vehicle damping is achieved through a separate oil filled device providing a hydraulic type of damping by restricting the flow of oil through a series of orifices. Other air springs use a fluid shock absorber strut in combination with the air spring to provide the desired damping. Still other devices use an external reservoir and solenoid control valve for regulating the fluid pressure in the interior of the air spring sleeve or bellows.

It is desirable to provide an air spring having an inexpensive, efficient, and relatively maintenance free device which will supply internal damping to an air spring comparable to that provided by a hydraulic shock absorber thereby eliminating the need of an external shock absorber, which will have very little effect on the lateral, vertical and torsional performance of the air spring sleeve, and which can be positioned to provide a desired amount of damping in either the jounce or rebound direction.

U.S. Pat. No. 3,831,628 discloses a check valve comprising a flat ring and a flexible one-way valve used to control fluid flow between pipes. The valve opens when a predetermined fluid flow rightfully occurs.

U.S. Pat. No. 3,883,030 discloses a breather cap for a brake which includes a unidirectional valve. The breather valve is lifted off its seat to permit air to flow freely into the atmosphere. When the valve is closed, that is when the interior pressure becomes less than atmospheric, it rests on its seat which has roughened portions which prevent a perfect seal and permits air to flow around the valve.

U.S. Pat. No. 3,901,272 discloses a unidirectional flow valve having an openable central slit which controls fluid flow through the valve. Higher pressure in one passageway maintains the slit closed around a wire to permit only a controlled air flow into another passageway. Higher internal pressure causes the flaps to move and permits free air to flow between the two passageways.

U.S. Pat. No. 4,383,679 discloses a damper device for suspension of an engine. The device includes armatures and an elastic block interposed between them. A plate divides a bore into two chambers and has an orifice tube which provides an unrestricted flow communicating between the two chambers.

Russian Pat. No. 783,515 discloses a pneumatic spring damper having bellows-type rubberized cord casing, a damping chamber and a hemisphere cap set clear of the cover, side and bottom of the cap. Due to the motion of the fibroid objects in the downward direction, air flows from the rubberized cord casing through the opening in the cover and into the bottom of the cap.

Russian Pat. No. 1,100,442 discloses a pneumatic vibration damping element having a bellows-type rubber coated envelope. A belt is pressed against rubber reinforcement and air from the rubber cord envelope flows into a damping chamber through an aperture at a low resistance and through a pipe having a high resistance, and then through nozzles. The vibrations are dampened by interaction of streams flowing from the orifice and nozzle. The higher the traveling speed of the objects to be isolated from the vibrations, the more effective is the interaction of the air streams and the greater the damping resistance.

Therefore, the need exists for a damping device, and in particular for an inexpensive, relatively maintenance free, valve which can be used in combination with an air spring or pneumatic shock absorber strut for controlling the damping of the device.

DISCLOSURE OF THE INVENTION

Objectives of the invention include providing an improved damping absorption device employed in a pneumatic rubber bellows-type air spring or in an air spring using a shock absorber strut which provides a desired amount of damping by controlling the motion of the fluid within the air spring or shock absorber strut to allow fluid flow more freely in one direction than in the opposite direction.

Another objective is to provide such an improved damping device which provides internal damping for an air spring which is comparable to a hydraulic shock absorber, but at a reduced cost and virtually maintanence free.

A still further objective is to provide such an improved damping device in an air spring which includes a diaphragm formed of a flexible, cord-reinforced rubber having one or more slots which provides one or more flexible flaps which move into a predetermined sized damping orifice to restrict fluid flow through the orifice when the fluid is moving in one direction, and in which the flaps move out of the orifice when the fluid is flowing in the other direction; and in which the diaphragm may be mounted on a solid metal member formed with the damping orifice, preferably a simple, inexpensive metallic washer.

A still further objective of the invention is to provide such a damping device which can be mounted in the lower end of a hollow piston rod telescopically mounted in an outer cylinder for effecting the flow of a fluid or air between the interior of the piston rod and bottom of the cylinder when a shock absorber strut is used in combination with an air spring; and in which the damping device can be used either with an internal or external fluid reservoir for controlling the movement of the fluid from the reservoir into and out of the flexible bellows of the air spring.

Still another objective of the invention is to provide such an improved damping device in combination with an air spring suspension system which will provide the necessary damping performance as the heretofore used strut-type shock absorbers without affecting the lateral, vertical and torsional performance of the air chamber forming bellows; in which the device can be used either on the compression or the extended damping stroke and in which various damping characteristics can be achieved by changing the configuration of the slots formed in the flexible diaphragm portion of the device or by changing the size of the fixed damping orifice with which the flaps cooperate to achieve the desired damping.

These objectives and advantages are obtained by the improved air spring suspension system of the invention which is of the type having first and second end members mounted in a spaced relationship and movable towards and away from each other, and having a flexible sleeve connected to said end members for forming a fluid pressure chamber therebetween, wherein the general principle of the invention may be stated as including valve means for controlling the flow of fluid into and out of the fluid pressure chamber upon movement of the end members towards and away from each other to provide damping, with the valve means allowing greater fluid flow in one direction than in the other.

BRIEF DESCRIPTION OF THE DRAWINGS

Preferred embodiments of the invention, illustrative of the best modes in which applicant has contemplated applying the principles are set forth in the following description and are shown in the drawings, and are particularly and distinctly pointed out and set forth in the appended claims.

Similar numerals refer to similar parts throughout the drawings.

BEST MODE FOR CARRYING OUT THE INVENTION

Figure 1:
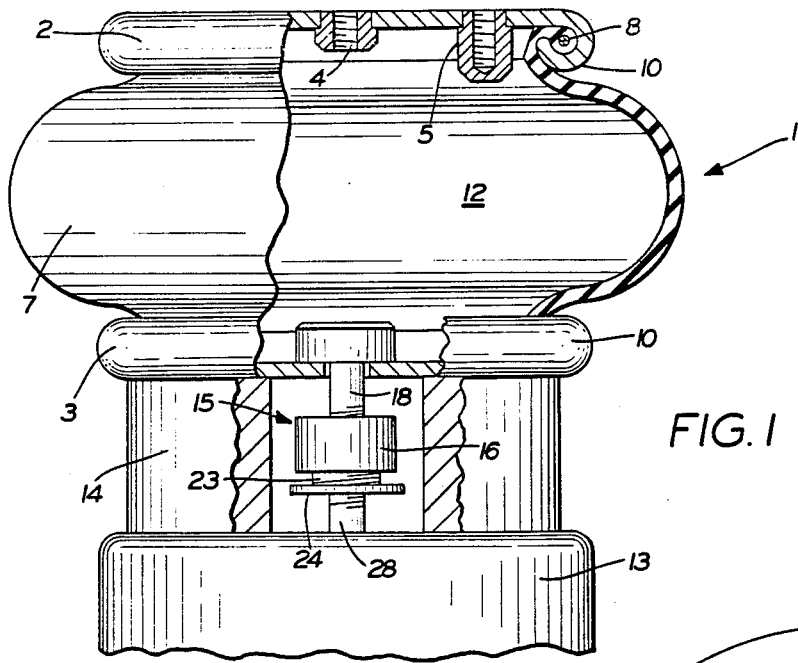
FIG. 1 is an elevational view with portions broken away and in section, showing an air spring having the improved damper valve incorporated therein.
Figure 3A:
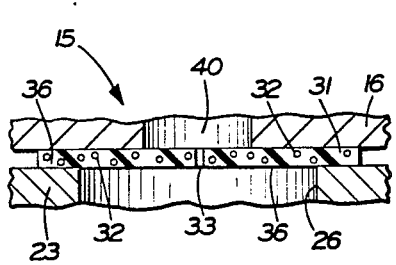
FIG. 3A is an enlarged fragmentary sectional view taken on line 3A—3A, FIG. 3.
Figure 2:
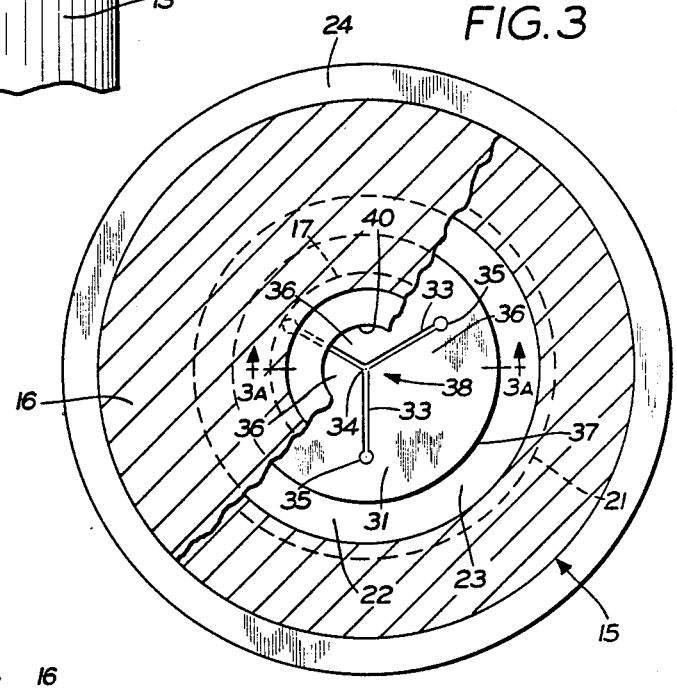
FIG. 2 is an enlarged fragmentary sectional view of the damper valve of the air spring of FIG. 1.
Figure 3:
FIG. 3 is an ensarged fragmentary sectional view taken on line 3—3, FIG. 2.

An air spring having the improved damping valve incorporated therein is indicated generally at 1, and is shown in a first embodiment shown in FIGS. 1, 2 and 3. Air spring 1 includes a top disc-shaped end member 2 and a similarly shaped bottom end member 3. A hole 4 may be formed in top end member 2 to provide a pressurized air inlet opening. A threaded inwardly extending boss 5 also may be mounted on end member 2 to provide a means for mounting the air spring on a supporting structure of a vehicle (not shown). A flexible elastomeric sleeve 7 having reinforced end beads 8 is secured in an airtight clamped relationship with the end members by rolled ends 10 (FIG. 1). Sleeve 7 provides a pressurized fluid reservoir 12 between the end members. Sleeve 7 is of a usual construction well known in the art and preferably contains internal fiber reinforcement (not shown) to provide strength to the sleeve.

An external reservoir 13 is mounted by an annular collar 14 on bottom end member 3 and contains a supply of compressed fluid, generally air. The interior of reservoir 13 communicates with fluid reservoir 12 of sleeve 7 through the improved two-way damping valve which is indicated generally at 15 (FIG. 3A). Valve 15 includes a mounting block 16 (FIG. 2) having an upper threaded opening 17 into which a nipple 18 is engaged. An enlarged internally threaded opening 21 is formed in the bottom portion of block 16 in which the shank portion of a threaded sleeve 23 is engaged. Sleeve 23 terminates in an annular end collar 24 and is formed with an end bore opening 26 which communicates with a bore 27 of a second nipple 28. Nipple 28 also has a threaded outer end which is engaged with an internally threaded bore 30 of sleeve 23. Block 16 also is formed with a fixed predetermined size damping orifice 40 axially aligned with bores 20 and 27 of nipples 18 and 28, respectively, and with enlarged opening 26 of block 16.

Figure 7:
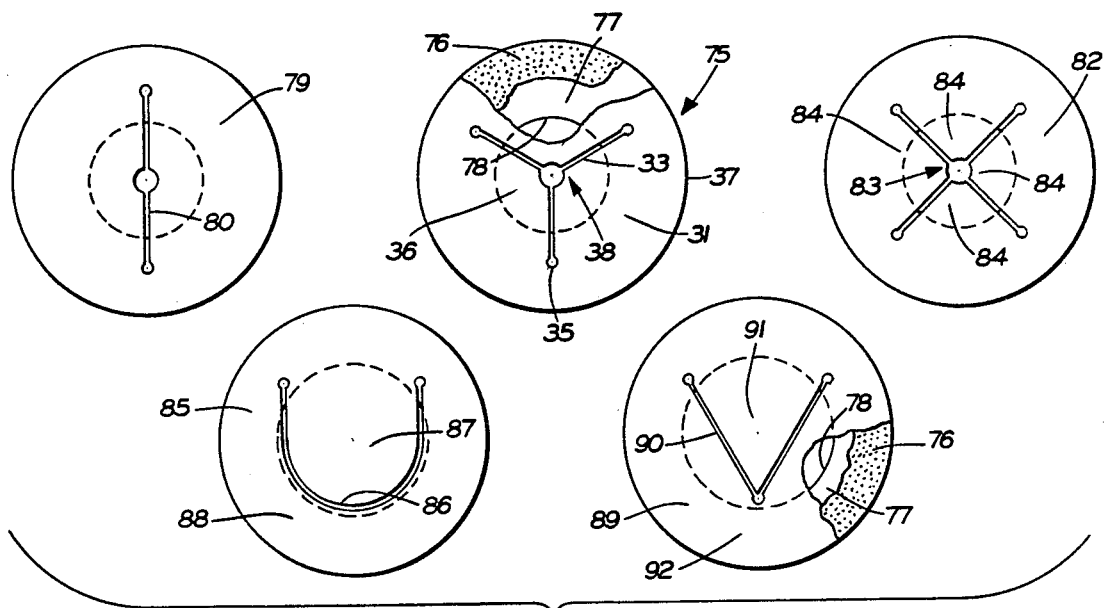
FIG. 7 are top plan views, two of which have portions broken away, of various embodiments of the damper valve for mounting in pneumatic pressure devices, such as the air springs of FIGS. 1 and 4.

Improved damping valve 15 further includes a flat, preferably disc-shaped piece of material which forms a diaphragm 31 (FIG. 3A). Diaphragm 31 preferably is formed of rubber reinforced with fiber strands 32 and has one or more slots 33. Various slot arrangements can be used as shown in FIG. 7 to achieve various damping characteristics. The particular slot arrangement shown in the embodiment of FIGS. 1-3 is a "Y" shaped arrangement indicated generally at 38, as shown in FIG. 3, formed by three slots 33 which merge at a center point 34. The outer ends of each slot terminate in a circular hole 35 which reduces tearing of the diaphragm and facilitates bending of flaps 36 formed by the slots. Three flaps, each of which is indicated at 36 is formed in diaphragm 31 and is defined by two slots 33 and the outer peripheral edge 37 of the diaphragm.

Diaphragm 31 is maintained within block 16 and is pressed against an annular surface 39 by annualr end surface 22 of sleeve 23. (FIG. 2). When in the position of FIG. 2 center point 34 of slots 33 is in axial alignment with the center of nipple bore 27 and bore 20 of nipple 18.

The operation of improved damping valve 15 is shown diagrammatically in FIG. 2. Upon air or other type of fluid moving from reservoir 13 into fluid pressure chamber 12 in the direction of Arrow A, which occurs when the end members are moving axially apart as in rebound, the flaps move inwardly into damping orifice 40 of block 16. This movement of the flaps reduces the effective size of orifice 40 and retards the passage of fluid therethrough. Thus, the fluid moving from reservoir 13 into fluid reservoir 12 must flow through a restricted passage. In contrast, when the air or other fluid is moving from reservoir 12 into reservoir 13, as in the jounce position wherein end member 2 and 3 are moving axially toward each other and are expelling fluid from reservoir 12, flaps 36 will move into enlarged circular opening or bore 26 of block 16 as shown by the lower dot-dash flaps in FIG. 2. This provides an unrestricted fluid passage through orifice 40 in contrast to the restricted passage which is formed when the flaps move in the opposite direction and into orifice 40. The fixed size of orifice 40 is important in that this determines the damping rate provided by valve 15 and will be larger than adjacent opening 26.

Figure 4:
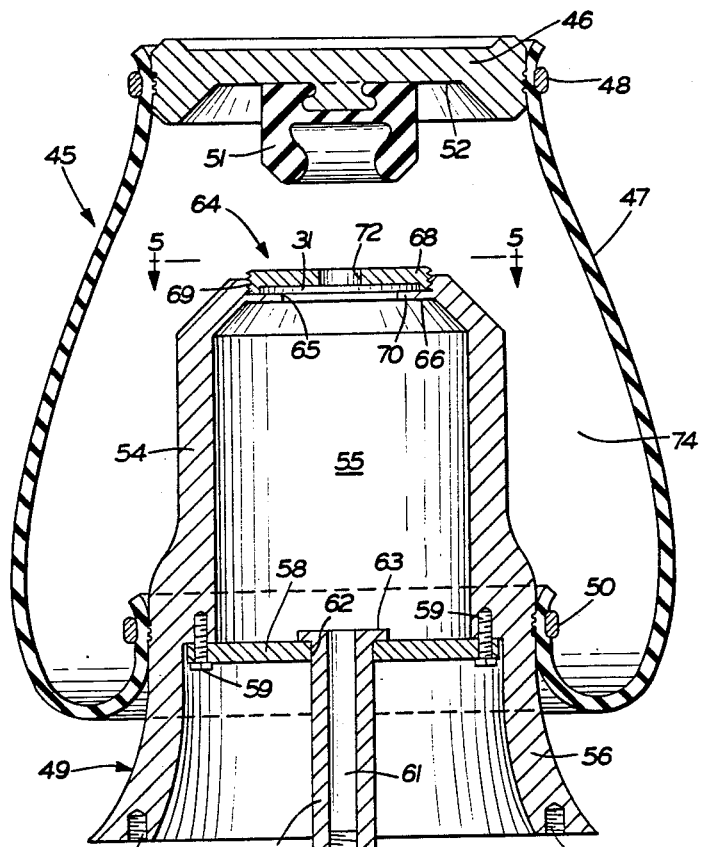
FIG. 4 is a sectional view of a modified air spring having the improved damper valve of the invention incorporated therein.
Figure 5:
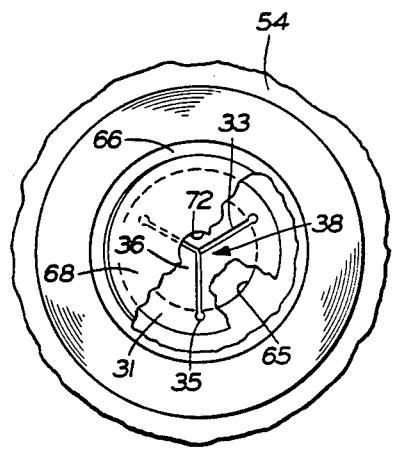
FIG. 5 is a fragmentary elevational view with portions broken away, looking in the direction of arrows 5—5, FIG. 4.
Figure 6:
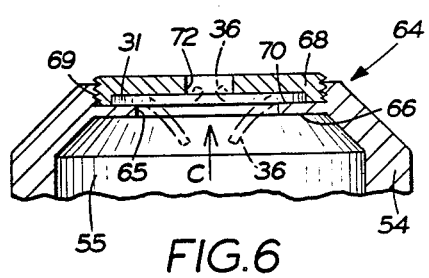
FIG. 6 is an enlarged fragmentary sectional view showing the damper valve of the air spring shown in FIG. 4, with the valve flaps being shown in dot-dash lines in two operating positions.

A modified embodiment of an air spring containing the improved damping valve is indicated generally at 45, and is shown in FIGS. 4-6. Modified air spring 45 includes a top end number 46 and a flexible elastomeric sleeve 47 which is sealingly connected to end member 46 by a clamping ring 48. The opposite end of sleeve 47 is sealingly secured to a lower member indicated generally at 49, by a second clamping ring 50. A rubber bumper 51 preferably is mounted on the inner surface 52 of end member 46.

Lower member 49 is provided with a generally cylindrical wall 54 which forms an interior reservoir 55 located within flexible sleeve 47. The lower end of member 49 includes a base 56 formed with a plurality of threaded openings 57 for mounting member 49 on a structural portion of a vehicle spaced from another portion of the vehicle on which top end member 46 is secured. A plate 58 is secured by a plurality of bolts 59 in an upper portion of base 56 to form the bottom wall of interior reservoir 55. An air inlet tube 60 communicates with reservoir 55 through its hollow bore 61. Tube 60 extends through a complementary shaped hole 62 formed in end wall plate 58 and may have a flanged upper end 63 formed thereon.

In accordance with the invention an improved two-way damping valve indicated generally at 64, is mounted adjacent to an opening 65 formed in a top wall 66 of lower end number 49. Valve 64 includes an externally threaded male sleeve 68 engaged in a threaded opening 69 of end wall 66 and presses flexible diaphragm 31 of valve 64 against an annular shoulder 70 formed between top wall openings 65 and 69. Diaphragm 31 of modified air spring 45 is similar to the diaphragm mounted in air spring 1 of FIGS. 1–3 and is shown with the same "Y" shaped slot configuration 38, but may have other configurations similar to those shown in FIG. 7.

The operation of modified embodiment 45 is shown diagrammatically in FIG. 6. Sleeve 68 is formed with a predetermined size damping orifice 72 which is larger than axially aligned opening 65 of top wall 66. Flaps 36 move into orifice 72 when the air or other damping fluid flows from interior reservoir 55 into fluid pressure reservoir 74 formed by sleeve 47 (Arrow C, FIG. 6) which will occur as end members 46 and 49 move axially away from each other. As shown in FIG. 6, the movement of flaps 36 into orifice 72 reduces or restricts the area of the opening restricting the movement of fluid therethrough. Upon end members 46 and 49 moving axially toward each other, air is expelled from pressure reservoir 74 through orifice 72 and into reservoir 55. Upon the air movement in this direction which is opposite to that of Arrow C, flaps 36 move away from orifice 72 (shown by dot-dash lines) providing an unrestricted orifice 72. This provides a damping characteristic different than that provided upon movement of the end members away from each other when the fluid flow through restricted orifice 72.

Bumper 51 prevents end member 46 from direct contact with top wall 66 of end member 49 and provides a cushioning effect thereto should end member 46 completely collapse into contact with the top wall. Also, air inlet tube 60 preferably is connected to an external supply valve for providing makeup air into reservoir 55 when required to achieve various operating characteristics. The movement of air or other fluid into and out of reservoir 55 through inlet tube 60 is by a known type of control valve and supply system and, therefore, is not shown in the drawings.

Another modified form of the improved two-way damping valve is indicated generally at 75, with a number of embodiments being shown in FIG. 7. Valve 75 includes diaphragm 31 preferably secured by an adhesive 76 to a annular metal washer 77. Washer 77 has a central opening 78 which forms the damping control orifice similar to orifice 40 of valve 15 and orifice 72 of valve 64. Valve 75 can be mounted within an air spring and eliminates the need for the damping control orifice to be formed as an integral part of the air spring body. This enables the damping characteristics of the air spring to be changed easily by merely replacing valve 75 with a similar valve, but with a different size damping orifice 78 without even changing the external dimension of washer 77.

Various other damping characteristics can be obtained by providing diaphragm 31 with a variety of flap configurations, sizes and arrangements as shown in FIG. 7. Diaphragm 79 has a single slot 80 which forms a pair of flaps. Diaphragm 31 includes the Y-shaped slot arrangement shown in the particular embodiments of FIGS. 1-6. Diaphram 82 includes an X-shaped slot configuration indicated at 83 which forms four generally V-shaped flaps, each of which is indicated at 84. Diaphragm 85 is formed with a U-shaped slot 86 which forms a single U-shaped main flap 87 and a surrounding flap 88. Flap 87 provides the main obstruction it moves into the fixed damping orifice as described above. A still further modified diaphragm is indicated at 89 and has a V-shaped slot 90 formed therein which forms a main V-shaped flap 91 and a surrounding flap 92.

The various slot configurations formed in the diagrams of FIG. 7 are representative of different configurations that can be provided, each of which provides a different damping characteristic by the effect that the flaps have on the movement of air through the fixed damping orifice. Preferably the diaphragm of FIG. 7 will be mounted on a backing washer 77 to provide a self-contained valve with the washer opening forming the damping orifice.

Another fluid suspension unit using the improved two-way damping valve is indicated generally at 95, and is an air spring in combination with a strut-type fluid shock absorber, and is shown particularly in FIGS. 8–11. Suspension unit 95 includes an outer cylinder 96 having a vehicle attachment bracket 97 mounted on the lower end thereof for mounting the unit on a vehicle. A piston rod 98 is mounted within cylinder 96 and is formed with a hollow interior 99. The top end of piston rod 98 is connected to a solenoid control valve 100 having a fluid inlet opening which communicates with a supply of a compressed fluid, usually air, for supplying make-up air to the interior of the piston rod. The upper end of rod 98 and valve 100 is fixed with respect to an annular mounting cup 103 which is connected to an outer flange 104 which is fixed to a vehicle in a spaced relationship from the other portion of the vehicle to which attachment bracket 97 is secured.

A cylindrical can-like member 105 is mounted by a compression fit on the lower end of an inverted cup-shaped housing 106 with the upper end of a elastomeric sleeve 107 being clamped therebetween. The lower end of sleeve 107 is secured by a clamping ring 108 to the upper end of outer cylinder 96. The upper end of housing 106 is connected to a ring cap 102 which is rotatably mounted with respect to mounting cap 103 by a bearing (not shown). Thus, ring cap 102, housing 106, sleeve 107 and cylinder 96 are rotatably mounted with respect to mounting cap 103 and piston rod 98. A plurality of nylon bearing rings 109 are telescopically mounted on piston rod 98 within cylinder 96 for rotatably mounting the cylinder with respect to the piston rod. An upper bearing ring 110 is located between piston rod 98 and the top end of cylinder 96 and is secured in position on the flanged end of a spacer sleeve 112 by a cap washer 111. A plurality of other spacer sleeves 112A and 112B are located between bearing rings 109 and at bottom end cap 118 of cylinder 96 as shown particularly in FIG. 11.

A resilient annular bumper 113 preferably is bonded to ring cap 102 and is telescopically, slidably mounted with respect to the upper end of piston rod 98. Ring cap 102 preferably is spaced from piston rod 98 by a spacer ring 119. Resilient sleeve 107 forms a fluid pressure reservoir 115 which communicates with the annular space 116 located between piston rod 98 and cylinder 96. It also communicates and with the fluid space or reservoir 117 located beneath the bottom end of piston rod 98 and bottom wall 118 of cylinder 96. Air spring sleeve 107 is used primarily in suspension unit 95 for regulating the axial spacing between mounting bracket 97 and flange 104.

In accordance with one of the features of the invention, a two-way damping valve indicated generally at 120, is mounted in the lower end of piston rod 98 for controlling the movement of the damping fluid between hollow interior 128 of the piston rod and reservoir 117 to provide the desired damping characteristics for suspension unit 95.

Damping valve 120 is similar in many respects to valves 15 and 64 in that it includes flexible rubber diaphragm 31 (FIGS. 9 and 10) having one or more flaps 36 axially aligned with a predetermined fixed damping orifice 123 formed in a flanged washer 124. Washer 124 is clamped against an annular shoulder 125 formed in the bottom end of piston rod 98 by an internally threaded end cap 126 which is threadably engaged with the lower end of rod 98. End cap 126 is formed with a central opening 127 having a larger diameter than that of fixed damping orifice 123. Diaphragm 131 as shown in FIG. 10 is formed with the "Y"-shaped slot arrangement 38 providing three flaps 36. Again, the particular configuration of the diaphragm slots and resulting flaps can vary without affecting the concept of the invention.

Figure 9:
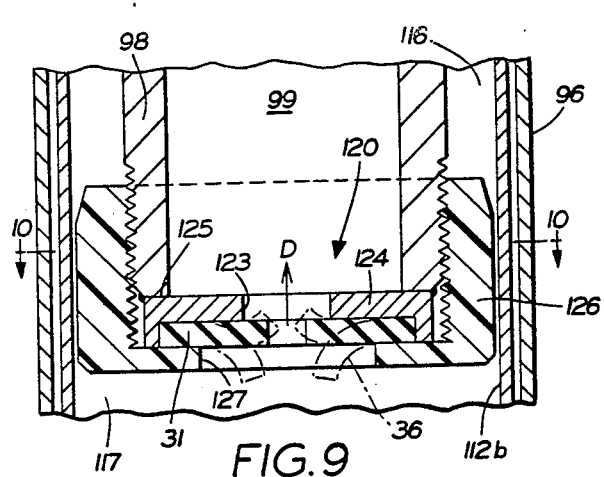
FIG. 9 is an enlarged fragmentary sectional view showing the damper valve mounted in the pneumatic strut of FIG. 8.
Figure 8:
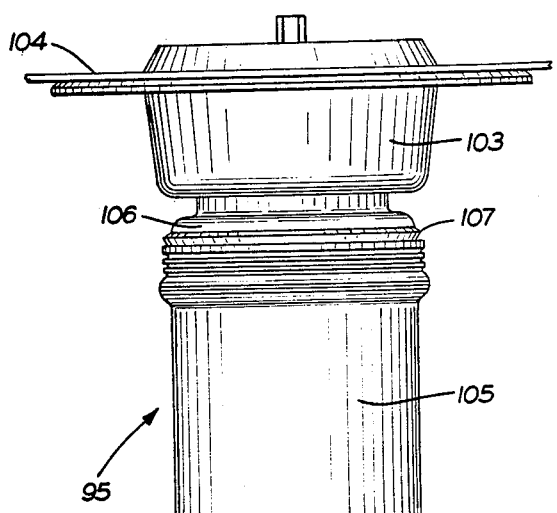
FIG. 8 is an elevational view with portions broken away and in section, of a pneumatic shock absorber strut and air spring having the improved damper valve incorporated therein.
Figure 10:
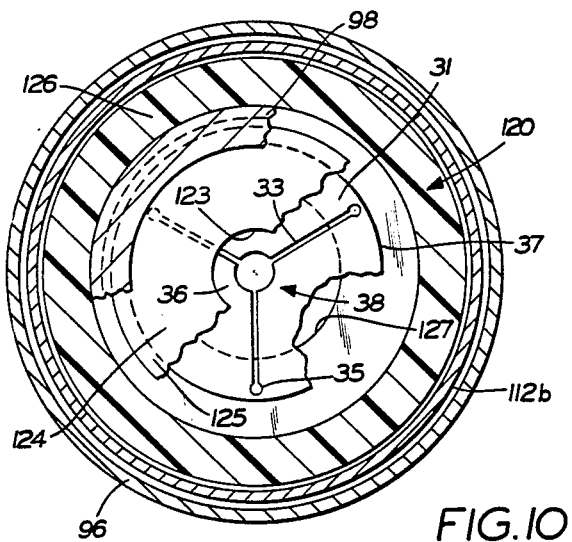
FIG. 10 is a fragmentary sectional view with portions broken away, taken on line 10—10, FIG. 9.
Figure 12:
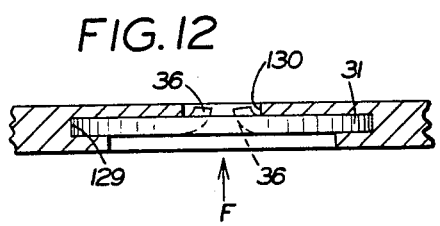
FIGS. 12-15 are fragmentary diagrammatic views showing the operation of two different damper valve configurations.

The operation of damping valve 120 is shown in FIG. 9 wherein fluid movement in the direction of Arrow D will cause flaps 36 to move into fixed damping orifice 123 to restrict the flow of fluid therethrough and will move away from the orifice as shown by the lower dot-dash flaps when the fluid moves in an opposite direction to that of Arrow D, that is from piston rod interior 99 into cylinder reservoir 117. This provides for the unrestricted flow of the fluid through orifice 123.

Figure 13:
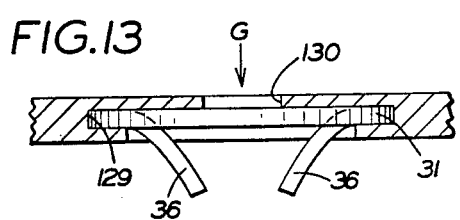

The operations of the improved damping valves are shown diagrammatically in FIGS. 12–15. The damping valve shown in FIGS. 12 and 13 consist of diaphragm 31 which is trapped within an annular cutout 129 formed with a fixed damping orifice 130. Fluid movement in the direction of Arrow F is restricted by the flaps entering orifice 130, whereas fluid movement in the opposite direction as shown in FIG. 13 (Arrow G) is unrestricted through orifice 130.

Figure 14:
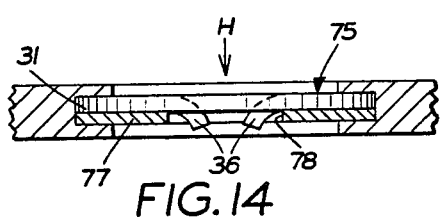
Figure 15:
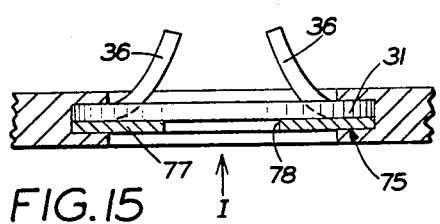
Figure 11:
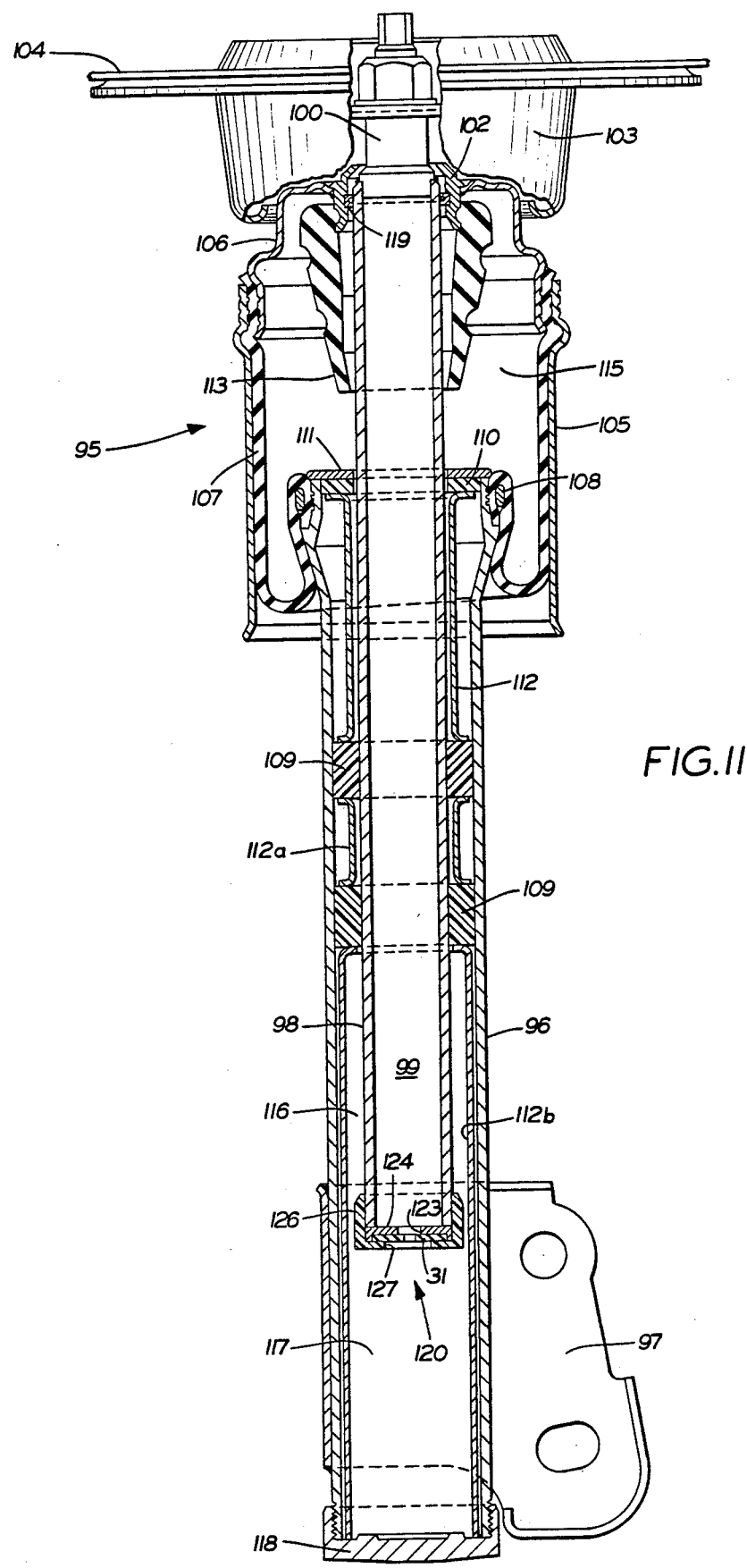
FIG. 11 is an enlarged view with portions broken away and in section of the pneumatic strut of FIG. 8.

FIGS. 14 and 15 show the use of damping valve 75 consisting of the flexible resilient diaphragm 31 bonded to washer 77 with the washer opening 78 forming the damping orifice. Fluid moving in the direction of Arrow H (FIG. 14) is restricted, whereas fluid flowing in the direction of Arrow I (FIG. 15) is restricted only by the predetermined size of orifice 78.

Thus the improved damping valve can either restrict or permit the flow of fluid of an air suspension unit in either direction between the fluid pressure reservoir formed by a flexible sleeve and an auxiliary fluid reservoir located either externally as shown in FIG. 1 or internally as shown in FIG. 4, or in combination with a reservoir provided in the bottom of cylinder 96, to achieve various desired damping characteristics for the suspension unit. The improved damping valve is an extremely simple, inexpensive and nearly maintenance-free device which will usually outlive the life of the suspension unit in which it is mounted. The device can provide various damping characteristics by changing the size of the fixed damping orifice or by changing the flap configuration as shown in FIG. 7 to provide various flap arrangements by different slot arrangements. The use of a circular hole at the ends of the flap forming slots provides greater flexibility to the flaps while reducing tearing of the diaphragm.

Although air will be the preferred fluid for the various suspension units described above, other fluids could be used without affecting the concept of the invention. The improved device provides damping for an air spring alone or combined with a shock absorber strut comparable to that provided by an external hydraulic shock absorber for a minimum cost and with very little effect on the natural frequency and lateral or vertical movement of the flexible sleeve portion of the unit. The damping valve can be used either for damping during the compression or extended condition, and the diaphragm can be used either with or without a metal washer.

The improved damping valves 15, 64, 75 and 120 can be mounted by various arrangements between the pressurized fluid reservoir of the air spring sleeve and auxiliary reservoir by means other than shown in the drawings and described above. If desired the valve can be bonded into a rubber mount or other mechanical mounting device without affecting the concept of the invention.

Accordingly, the improved damping valve is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved damping valve for air spring suspension systems is constructed and used, the characteristics of the construction, and the advantageous, new and useful results obtained; the new and useful structures, devices, elements, arrangements, parts, and combinations, are set forth in the appended claims.

What is claimed is:

1. An improved air spring of the type having first and second end members mounted in a spaced relationship and movable towards and away from each other, and a flexible sleeve connected to said end members and forming a fluid pressure chamber therebetween, wherein said improvement includes valve means for controlling the flow of a fluid into and out of the fluid pressure chamber upon movement of the end members towards and away from each other to provide damping, said valve means including a fixed predetermined sized orifice opening and a flexible diaphragm formed with at least one slot forming at least two flaps movable into and out of said orifice opening to vary the effective size of said opening for allowing greater fluid flow in one direction than in the other.

2. The air spring defined in claim 1 in which the slot is Y-shaped forming three flaps.

3. The air spring defined in claim 1 in which the slot is X-shaped forming four flaps.

4. The air spring defined in claim 1 in which the slot is U-shaped forming a single U-shaped solid flap and a surrounding secondary flap.

5. The air spring defined in claim 1 in which the slot is V-shaped forming a single V-shaped solid flap and a surrounding secondary flap.

6. The air spring defined in claim 1 in which the first end member is formed with a fluid reservoir located within the fluid pressure chamber formed by the flexible sleeve; and in which fluid flows between the reservoir and the pressure chamber through the valve means.

7. The air spring defined in claim 1 in which a fluid pressure reservoir is mounted on the first end member externally of the pressure chamber; and in which fluid flows between the reservoir and the pressure chamber through the valve means.

8. The air spring defined in claim 1 in which the flexible diaphragm is mounted adjacent to a rigid washer having a central opening formed therein providing the predetermined sized orifice; and in which the flexible diaphragm is formed of fiber reinforced rubber.

9. An improved suspension system for vehicles including:
(a) a fluid shock absorber strut having an outer cylinder and a hollow piston rod reciprocally movable within the cylinder;
(b) first attachment means for securing the cylinder to a first vehicle support structure;
(c) second attachment means for securing the piston rod to a second vehicle support structure spaced from the first vehicle support structure;
(d) a fluid reservoir formed within the interior of the cylinder; and
(e) two-way valve means controlling the flow of a fluid between the reservoir and interior of the piston rod to provide damping, said valve means including a fixed predetermined sized orifice opening and a flexible diaphragm formed with at least one slot to form at least two flexible flaps, said flaps being movable into and out of the fixed orifice opening to vary the effective size of said opening for controlling the amount of fluid moving through said opening to allow greater fluid flow in one direction than in an opposite direction.

10. The suspension system defined in claim 9 in which a rigid annular washer is mounted adjacent the diaphragm; and in which a central opening in the washer forms the orifice.

11. The suspension system defined in claim 9 in which a flexible sleeve is sealingly connected to and extends between the piston rod and cylinder forming a fluid pressure chamber for controlling the spacing between the first and second attachment means.

12. An improved two-way valve for controlling the flow of a fluid into and out of a fluid pressure chamber of an air spring of the type having first and second end members mounted in a spaced relationship and movable towards and away from each other and having a flexible sleeve connected to said end members and forming said fluid pressure chamber with a fixed damping orifice communicating with the fluid pressure chamber; and said two-way valve including a flexible diaphragm formed with slots providing at least one flexible flap, said flap moves into the damping orifice to restrict the flow of fluid in one direction and moves away from the damping orifice allowing greater fluid flow through the damping orifice in an opposite direction upon movement of the end members towards and away from each other.

13. The improved valve defined in claim 12 in which the flexible diaphragm is mounted adjacent a rigid annular member formed with a fixed circular opening which forms the damping orifice; and in which the flap is movable into and away from said opening to vary the effective size of said opening for controlling the amount of fluid moving through said opening into and out of the pressure chamber.

14. The air spring defined in claim 13 in which the flexible diaphragm is bonded by an adhesive to the washer; and in which the diaphragm is formed with a plurality of flexible flaps.

* * * * *